US 8,513,856 B2

(12) United States Patent
Moon et al.

(10) Patent No.: US 8,513,856 B2
(45) Date of Patent: Aug. 20, 2013

(54) POWER TRANSMITTING MECHANISM ASSEMBLY

(75) Inventors: Chan-young Moon, Ansan-si (KR); Jong-ho Baek, Suncheon-si (KR); Dong-eui Shin, Anyang-si (KR); Jae-kyu Shim, Ansan-si (KR); Woo-jong Cho, Suwon-si (KR); Mun-cheol Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/551,976

(22) Filed: Jul. 18, 2012

(65) Prior Publication Data

US 2013/0127294 A1    May 23, 2013

(30) Foreign Application Priority Data

Nov. 17, 2011    (KR) ........................ 10-2011-0120327

(51) Int. Cl.
*H01L 41/08*    (2006.01)
(52) U.S. Cl.
USPC ................................ 310/323.02; 310/323.03
(58) Field of Classification Search
USPC .................................................... 310/323.02
See application file for complete search history.

(56) References Cited

U.S. PATENT DOCUMENTS

| 5,191,688 | A | * | 3/1993 | Takizawa et al. ............ 29/25.35 |
| 5,335,115 | A | | 8/1994 | Kawai et al. |
| 5,696,421 | A | * | 12/1997 | Zumeris et al. ............... 310/328 |
| 8,400,045 | B2 | * | 3/2013 | Cho et al. ................. 310/323.13 |
| 8,401,379 | B2 | * | 3/2013 | Cho et al. ....................... 396/324 |
| 2010/0149665 | A1 | * | 6/2010 | Fujiwara et al. .............. 359/824 |
| 2011/0133602 | A1 | * | 6/2011 | Moon et al. .............. 310/323.06 |
| 2011/0210646 | A1 | * | 9/2011 | Cho et al. ................ 310/323.02 |
| 2012/0218651 | A1 | * | 8/2012 | Onishi et al. ................. 359/824 |

* cited by examiner

*Primary Examiner* — Mark Budd
(74) *Attorney, Agent, or Firm* — Drinker Biddle & Reath LLP (57) ABSTRACT

A power transmitting mechanism assembly including a supporting plate; a first roller, which is rotatably attached to the supporting plate; a first plate, which contacts a first end of the first roller and is arranged to be able to rotate with respect to the supporting plate; a power generating unit, which generates power for rotating the first plate when a signal is applied; a second plate, which is arranged to contact a second end of the first roller; and a friction changing unit, which is attached to at least one of the first roller, the first plate, and the second plate and changes friction of a portion of a contacting surface between the first roller and the first plate or friction of a portion of a contacting surface between the first roller and the second plate.

17 Claims, 8 Drawing Sheets

POWER TRANSMITTING MECHANISM ASSEMBLY

CROSS-REFERENCE TO RELATED PATENT APPLICATION

This application claims the priority benefit of Korean Patent Application No. 10-2011-0120327, filed on Nov. 17, 2011, in the Korean Intellectual Property Office, which is incorporated herein in its entirety by reference.

BACKGROUND

1. Field of the Invention

The invention relates to a power transmitting mechanism assembly for a lens driving unit, and more particularly, to power transmitting mechanism assembly for a lens driving unit with improved power transmitting efficiency.

2. Description of the Related Art

An optics system including optical elements, such as lenses, include lens driving units for moving lenses. Lens driving units embody zooming function or auto-focusing function by changing relative distances between lenses by moving the lenses.

A lens driving unit may employ a driving unit like a stepping motor. In this case, it is necessary to employ a decelerating gear and a cam for changing rapid rotation of the step motor to linear movement, resulting in problems such as increase in volume of the lens driving unit, complicated structure of the lens driving unit, errors due to backlashes during normal rotation and reverse rotation, power consumption, high current and large heat generation, etc.

Recently, a piezoelectric device, which operates based on piezoelectric effect, is widely applied for moving lenses of an optics system. A very small driving motor may be manufactured by using a piezoelectric device.

However, in a conventional optics system employing a piezoelectric device, power transmitting efficiency for transmitting driving power of the piezoelectric device to a component for moving lenses is very low.

U.S. Pat. No. 5,335,115 discloses a lens moving mechanism for moving lenses. In a power transmitting mechanism assembly used in such a lens moving mechanism, power is transmitted by using friction force generated as a rotating roller and a ring contact each other. Theoretically, it is possible to acquire higher friction force by pressing a roller to a ring with a strong force. However, by doing so, dust may be formed from contacting surfaces of the roller and the ring, durability of the roller and the ring may be deteriorated, and noise and vibration may be generated. Furthermore, if a roller and a ring are assembled to press each other too weak or too hard, operation force of the power transmitting mechanism may be deteriorated.

SUMMARY

The invention provides a power transmitting mechanism assembly for a lens driving unit with improved power transmitting efficiency.

The invention also provides power transmitting mechanism assembly for a lens driving unit with improved durability, reduced noise and vibration, and reduced generation of dust.

According to an aspect of the invention, there is provided a power transmitting mechanism assembly including a supporting plate; a first roller, which is rotatably attached to the supporting plate; a first plate, which contacts a first end of the first roller and is arranged to be able to rotate with respect to the supporting plate; a power generating unit, which generates power for rotating the first plate when a signal is applied; a second plate, which is arranged to contact a second end of the first roller; and a friction changing unit, which is attached to at least one of the first roller, the first plate, and the second plate and changes friction of a portion of a contacting surface between the first roller and the first plate or friction of a portion of a contacting surface between the first roller and the second plate.

The first roller may comprise a metal.

The friction changing unit may be formed of a flexible material and is arranged to partially surround the outer surface of the first roller.

The friction changing unit may be formed to have a ring-like shape and extend in the circumferential direction of the first roller.

The first plate may include a groove portion formed on a surface contacting the first roller, and the friction changing unit may be formed of an elastic material and be inserted in the groove portion.

The groove portion and the friction changing unit may extend in the circumferential direction of the first plate.

The second plate may include a groove portion formed on a surface contacting the first roller, and the friction changing unit may be formed of an elastic material and be inserted in the groove portion.

The groove portion and the friction changing unit may extend in the circumferential direction of the second plate.

The power transmitting mechanism assembly may further include a second roller, which is formed of a first material having a friction coefficient different from that of a second material of the first roller, is apart from the first roller in the circumferential direction of the supporting plate, and is rotatably attached to the supporting plate.

The supporting plate may be formed to have a circular ring-like shape, and the first roller and the second roller may be symmetrically arranged around the center of the supporting plate.

The second roller may be formed of a rubber or a synthetic resin.

The supporting plate may include a supporting shaft that rotatably supports the first roller, and the friction changing unit may be formed of a material having a friction coefficient different from that of a material constituting the first roller and is rotatably attached to the supporting shaft to rotate independently from the first roller.

The first roller may include a shaft unit having a diameter smaller than a distance between the first plate and the second plate, and the friction changing unit may be rotatably attached to the shaft unit.

The power transmitting mechanism assembly may further include an ultrasonic actuator, which vibrates when a signal is applied; and a transmitting unit, which transmits vibration of the ultrasonic actuator to the first plate.

The power transmitting mechanism assembly may further include a base, which supports the ultrasonic actuator; and a pressing member, which is arranged between the base and the ultrasonic actuator and applies an elastic force.

The second plate may rotatably support the supporting plate.

The second plate may be arranged to be able to rotate with respect to the supporting plate.

BRIEF DESCRIPTION OF THE DRAWINGS

The above and other features and advantages of the invention will become apparent upon review of exemplary embodiments thereof with reference to the attached drawings, in which.

DETAILED DESCRIPTION

Hereinafter, the invention will be described in detail by explaining preferred embodiments of the invention with reference to the attached drawings.

Figure 1:
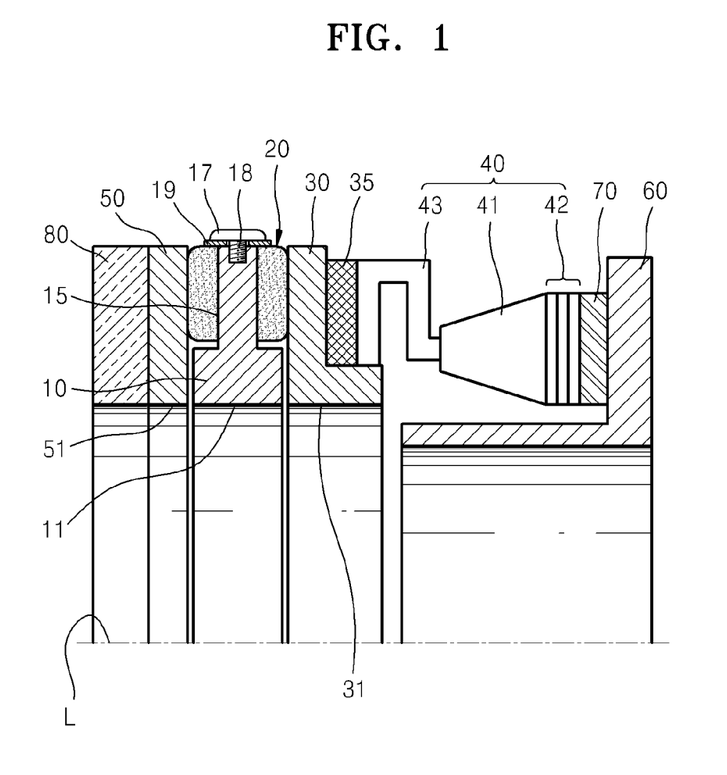
FIG. 1 is a lateral sectional view of a power transmitting mechanism assembly, according to an embodiment of the invention.
Figure 2:
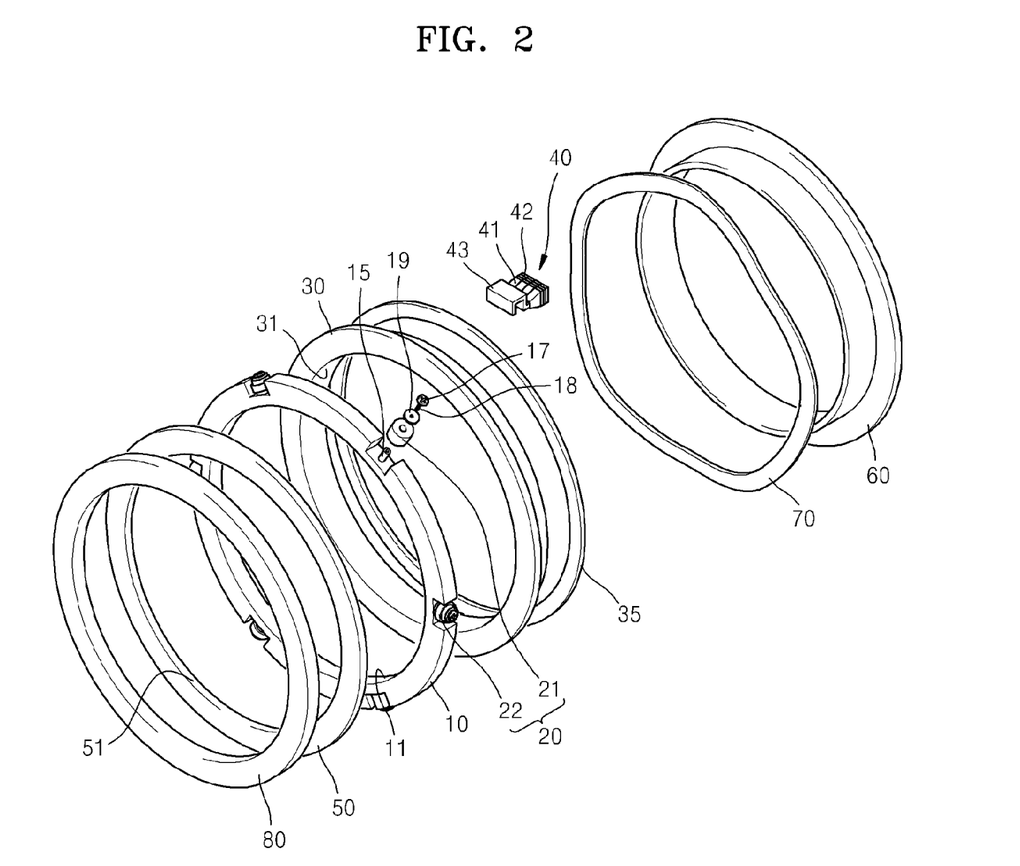
FIG. 2 is an exploded isometric view showing associative relationships of components of the power transmitting mechanism assembly of FIG. 1.

FIG. 1 is a lateral sectional view of a power transmitting mechanism assembly according to an embodiment of the invention, and FIG. 2 is an exploded isometric view showing associative relationships of components of the power transmitting mechanism assembly of FIG. 1.

The power transmitting mechanism assembly according to the embodiment shown in FIG. 1 includes a supporting plate 10, a roller 20 that is rotatably attached to the supporting plate 10, a first plate 30 that contacts a first end of the roller 20 and is arranged to be able to rotate with respect to the supporting plate 10, a power generating unit 40 that generates power for rotating the first plate 30 when a signal is applied, and a second plate 50 that contacts a second end of the roller 20. The second plate 50 may be manufactured to have a ring-like shape having an opening 51 inside.

The power transmitting mechanism assembly according to the embodiment shown in FIG. 1 may be used in an optical component transferring device for moving optical components, such as lenses, in the optical axis direction in an apparatus, such as a digital camera and a digital camcorder.

The power generating unit 40 includes an ultrasonic actuator 42 that vibrates when a signal is applied, and transmitting units 41 and 43 that transmit vibration of the ultrasonic actuator 42 to the first plate 30.

The ultrasonic actuator 42 may be a stacked piezoelectric device fabricated by stacking a plurality of electrodes or a single-layer piezoelectric device. When an alternating current (e.g., having a sinusoidal shape) is applied to the ultrasonic actuator 42, the ultrasonic actuator 42 generates repetitive vibration according to the waveform of the applied current.

Behind the ultrasonic actuator 42, a base 60 and a pressing member 70 are arranged. The pressing member 70 is interposed between the base 60 and the ultrasonic actuator 42, and applies elastic force to the base 60 and the ultrasonic actuator 42. The base 60 is fixed with respect to other rotating components and supports the ultrasonic actuator 42.

The pressing member 70 interposed between the base 60 and the ultrasonic actuator 42 applies elastic force between the base 60 and the ultrasonic actuator 42. Due to the pressing member 70, a pressing force may be maintained among components from the ultrasonic actuator 42 to the second plate 50.

Although the ultrasonic actuator 42 is used as a power source for generating power of the power generating unit 40, the invention is not limited thereto. For example, a stepping motor that generates rotation force by using an electric signal may be installed instead of the ultrasonic actuator 42 and rotation force of the stepping motor may be transmitted to the first plate 30 by using a power transmitting component, such as a roller.

The transmitting units 41 and 43 are arranged in front of the ultrasonic actuator 42 and include a stator 41 and a rotor 43 for transmitting vibration of the ultrasonic actuator 42. The stator 41 and the rotor 43 transmit force as being deformed by the ultrasonic actuator 42.

A guide ring 35 for buffering force, and the first plate 30 contacting the guide ring 35 are arranged in front of the rotor 43. The first plate 30 may be manufactured to have a ring-like shape having an opening 31 inside. The first plate 30 may be formed of a metal or a synthetic resin. The first plate 30 is arranged to be able to rotate with respect to the base 60 and the power generating unit 40.

The first plate 30 and the guide ring 35 are arranged to be pressed by the rotor 43. As vibration of the ultrasonic actuator 42 is transmitted to the guide ring 35 and the first plate 30 via the rotor 43, the first plate 30 and the guide ring 35 rotate around a rotation axis L. Since the guide ring 35 is formed of a rubber or elastic synthetic resin, the guide ring 35 removes components of force transmitted to various directions except a component of force for rotating the first plate 30.

The supporting plate 10 is arranged in front of the first plate 30. The supporting plate 10 is formed of a metal or a synthetic resin and may be manufactured to have a ring-like shape having an opening 11 inside.

The roller 20 is rotatably attached to the supporting plate 10. A plurality of the rollers 20 may be arranged to be apart from each other along the circumference of the supporting plate 10. Referring to FIG. 2, the rollers 20 include a second roller 21 and a first roller 22 that are apart from each other along the circumference of the ring-like supporting plate 10. However, the invention is not limited thereto. In other words, it is not necessary to arrange the second roller 21 and the first roller 22 as shown in FIG. 2, and only the first roller 22 may be arranged, for example.

Each of the rollers 20 is rotatably attached to a respective supporting shaft 15, which protrudes from the supporting plate 10 in a radial direction. When the roller 20 is rotatably attached to the supporting shaft 15, a guide bush 19 is arranged at an end of the roller 20, and a bolt 17 is inserted into an end of the supporting shaft 15. The bolt 17 may have threads 18 to couple the bolt 17 to the supporting shaft 15. Due to the bolt 17 and the guide bush 19, the roller 20 may rotate while attached to the supporting shaft 15.

Figure 3:
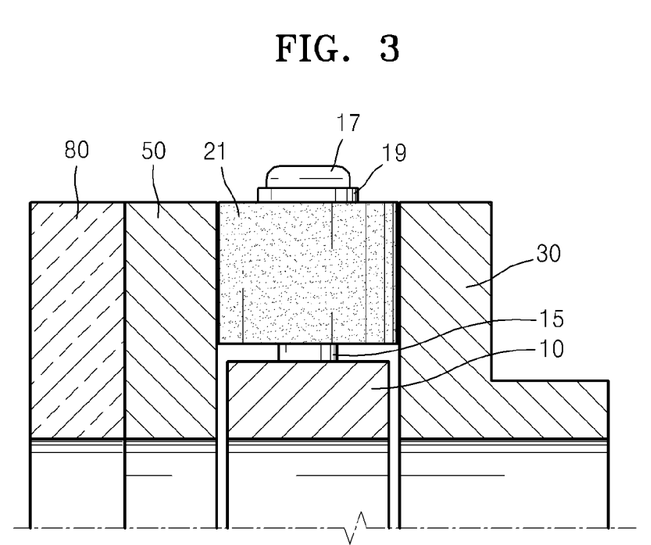
FIG. 3 is a lateral sectional view showing some components of the power transmitting mechanism assembly of FIG. 1 in closer detail.
Figure 4:
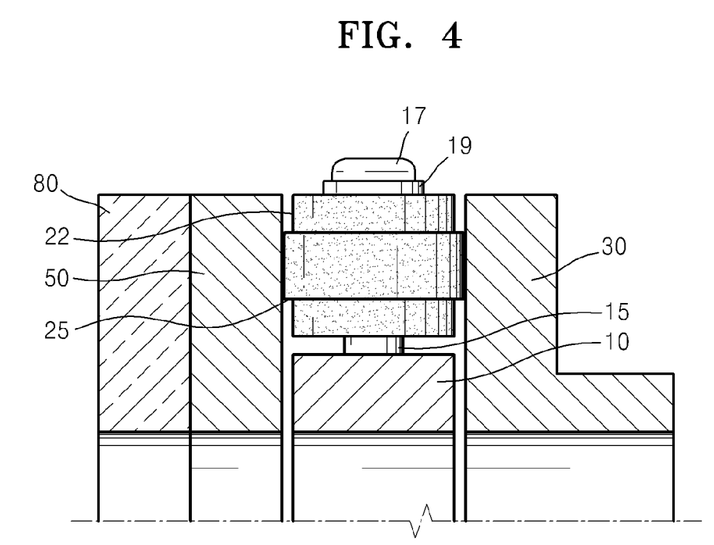
FIG. 4 is a lateral sectional view showing other components of the power transmitting mechanism assembly of FIG. 1 in closer detail.
Figure 5:
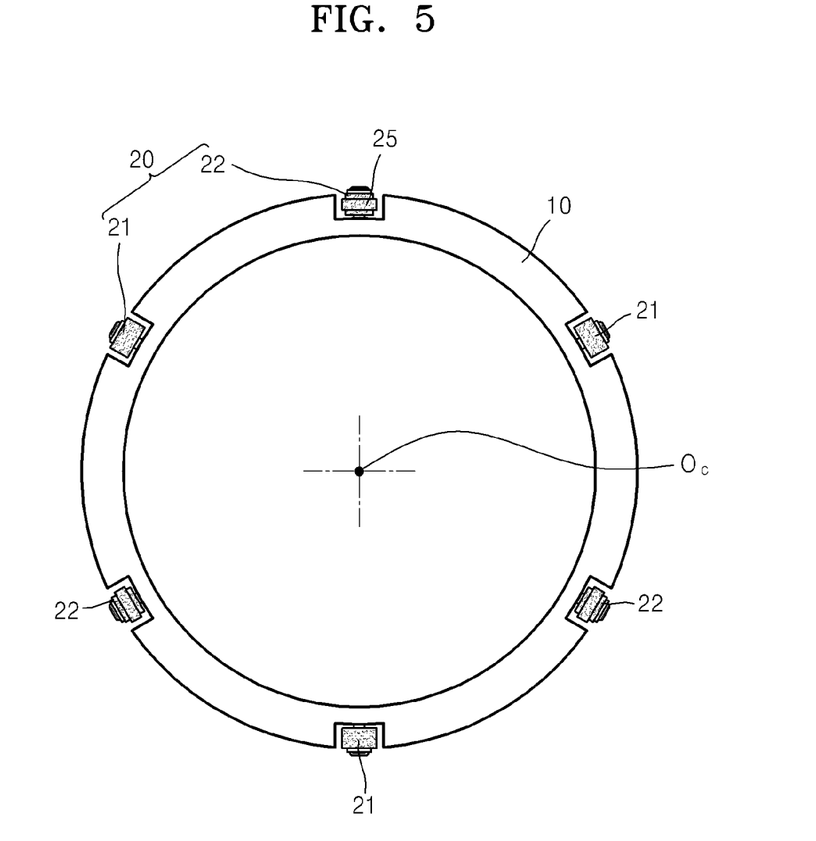
FIG. 5 is a front view showing a part of the power transmitting mechanism assembly of FIG. 1.

FIG. 3 is a lateral sectional view showing some of the components of the power transmitting mechanism assembly of FIG. 1 in closer detail. FIG. 4 is a lateral sectional view showing other components of the power transmitting mechanism assembly of FIG. 1 in closer detail. FIG. 5 is a front view showing a part of the power transmitting mechanism assembly of FIG. 1.

Referring to FIG. 5, the plurality of rollers 20 may be symmetrically arranged around the center Oc of the supporting plate 10. The second rollers 21 may be arranged to form an angle about 120 degrees therebetween around the center Oc of the supporting plate 10, whereas the first rollers 22 may be arranged between the second rollers 21 to form an angle about 120 degrees therebetween around the center Oc of the supporting plate 10.

The second roller 21 and the first roller 22 may be formed of different materials. For example, the second roller 21 may be formed of a rubber or a synthetic resin, whereas the first roller 22 may be formed of a metal.

However, the invention is not limited thereto. For example, the second roller 21 may be formed of a metal, whereas the first roller 22 may be formed of a hard synthetic resin.

The first roller 22 may include a contact ring 25 that extends in the circumferential direction and is arranged on an outer surface of the first roller 22. The contact ring 25 is an example of a friction changing unit. The contact ring 25 may be formed of a soft rubber or a synthetic resin.

The contact ring 25 has a ring-like shape and extends around the circumference of the first roller 22 to surround the first roller 22. However, the invention is not limited thereto. In other words, it is not necessary to manufacture the contact ring 25 to have a ring-like shape, and the contact ring 25 may only partially surround the outer surface of the first roller 22 in the circumferential direction instead of surrounding the entire outer surface of the first roller 22 in the circumferential direction.

Referring to FIGS. 1 through 4, the first plate 30 may contact a first end of the roller 20 and rotate. The second plate 50 is arranged at a second end of the roller 20. The second plate 50 is arranged in front of the supporting plate 10 and a portion of the second plate 50 is pressed toward the supporting plate 10 to contact the second end of the roller 20. A pressing plate 80, which presses the second plate 50 toward the supporting plate 10, may be arranged in front of the second plate 50.

The supporting plate 10 may be arranged to be able to rotate with respect to the base 60. For example, the second plate 50 may rotatably support the supporting plate 10. For example, the second plate 50 may be connected to the base 60 and fixed to the base 60.

In such a structure in which the supporting plate 10 is rotatably arranged, when rotation force of the first plate 30 is transmitted to the roller 20, the second plate 50 contacting the second end of the roller 20 is fixed, and thus the supporting plate 10 may rotate. Therefore, other component(s) may be moved by using rotation force of the supporting plate 10.

However, the invention is not limited thereto, and structures including the second plate 50 and the supporting plate 10 may vary.

For example, the supporting plate 10 may be arranged to be fixed with respect to the first plate 30 and the second plate 50. The supporting plate 10 may be fixed to the base 60 by mechanically connecting the supporting plate 10 to the base 60. In this case, it is necessary to arrange the second plate 50 to be able to rotate with respect to the supporting plate 10.

As described above, when the first plate 30 and the second plate 50 are rotatably arranged and the supporting plate 10 is fixed, the first plate 30 rotates as driving force of the power generating unit 40 is transmitted to the first plate 30. When the first plate 30 rotates, the roller 20 contacting the first plate 30 rotates. When the roller 20 rotates, the second plate 50 contacting the roller 20 rotates. Therefore, other component(s) may be moved by using rotation force of the second plate 50.

In the power transmitting mechanism assembly as described above, since the second roller 21 and the first roller 22 have different friction coefficients, friction between the roller 20 and the first plate 30 and friction between the roller 20 and the second plate 50 may increase. Therefore, power transmitting efficiency may be improved as compared to that of a power transmitting mechanism using rollers having a same friction coefficient.

Furthermore, in a case of using rollers formed of a same metal, for example, it is necessary to manufacture the rollers and rotating components at high precision and to minimize assembly tolerance thereof to maintain precise friction surfaces between the rollers and the rotating components. However, in the power transmitting mechanism assembly as described above, since the second roller 21 may be formed of an elastically deformable material, such as rubber or a synthetic resin, challenges in precisely manufacturing or assembling the first plate 30, the second plate 50, and the rollers 20 may be reduced.

Figure 6:
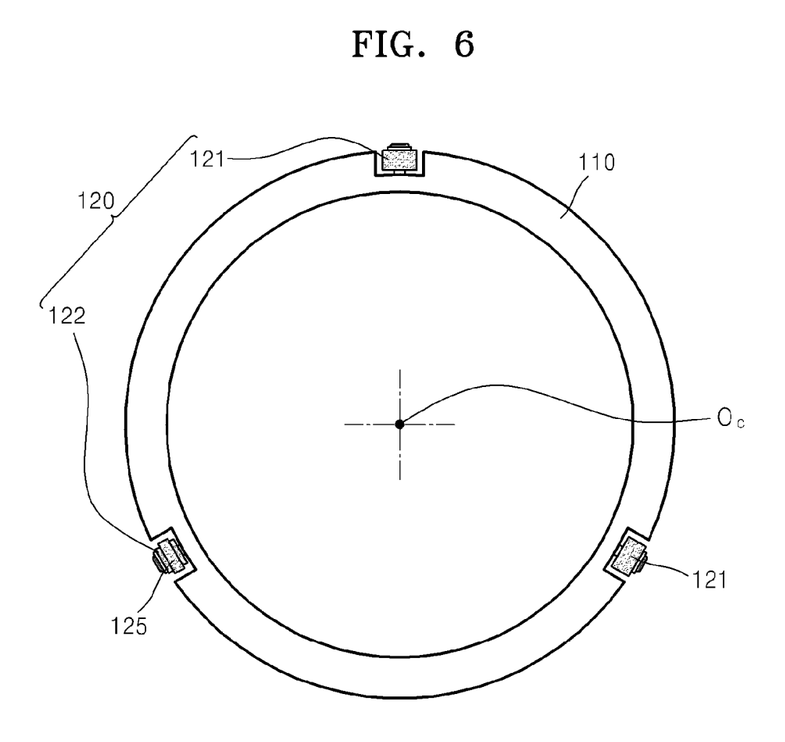
FIG. 6 is a front view of a part of components of a power transmitting mechanism assembly, according to another embodiment of the invention.

FIG. 6 is a front view of a part of components of a power transmitting mechanism assembly, according to another embodiment of the invention.

Compared to the power transmitting mechanism assembly according to the embodiment shown in FIG. 5, the power transmitting mechanism assembly according to the embodiment shown in FIG. 6 employs a different number of rollers 120. Three rollers 120 are arranged on a supporting plate 110. The rollers 120 are symmetrically arranged around the center Oc of the supporting plate 110. The rollers 120 includes second rollers 121 that are formed of a rubber or a synthetic resin and a first roller 122 formed of a metal. The first roller 122 may include a contact ring 125 that is arranged on the outer surface of the first roller 122 to extend in the circumferential direction of the first roller 122. The contact ring 125 corresponds to a friction changing unit.

Numbers and arrangements of the rollers 20 and 120 are not limited to those in the embodiments shown in FIGS. 5 and 6, and may vary according to design needs.

Although two types of rollers including the first rollers 22, 122, and the second rollers 21, 121 are arranged in the embodiments shown in FIGS. 1 through 6, the invention is not limited thereto. For example, only first rollers 22, 122 may be arranged on the supporting plate 10, 110. Even in a case where only first rollers 22, 122 are arranged, sufficient friction may be acquired due to a contact ring 25, 125 arranged on the outer surface of the first roller 22, 122.

Figure 7:
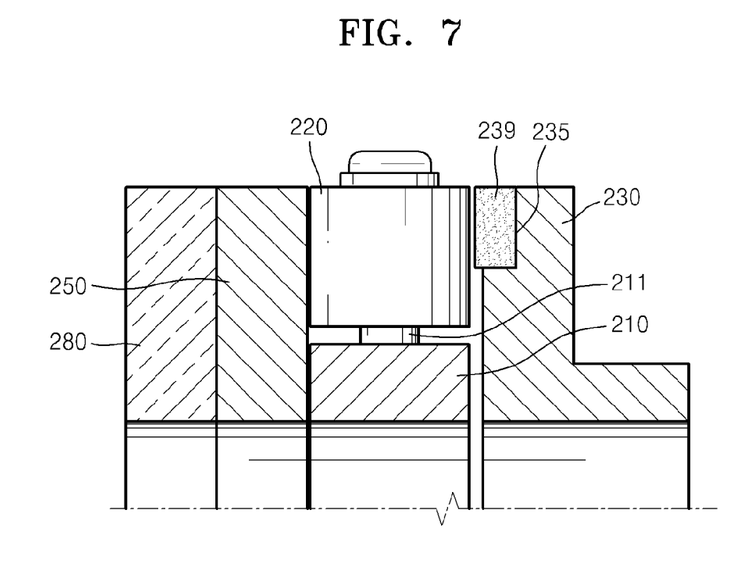
FIG. 7 is a lateral sectional view showing a part of components of a power transmitting mechanism assembly, according to another embodiment of the invention.

FIG. 7 is a lateral sectional view showing some components of a power transmitting mechanism assembly, according to another embodiment of the invention.

The power transmitting mechanism assembly according to the embodiment shown in FIG. 7 includes a supporting plate 210, a first roller 220 rotatably attached to a supporting shaft 211 of the supporting plate 210, a first plate 230 that contacts a first end of the first roller 220 and may rotate with respect to the supporting plate 210, a power generating unit (not shown) that generates power for rotating the first plate 230 when a signal is applied, and a second plate 250 that is arranged to contact a second end of the first roller 220. The power generating unit (not shown) may have the same structure as shown in FIG. 1 and illustration thereof is omitted in FIG. 7.

The first plate 230 includes a groove portion 235 that is formed on a surface facing the first roller 220. An elastic member 239 is inserted into the groove portion 235. The elastic member 239 corresponds to a friction changing unit that changes friction of a portion of a contacting surface between the first roller 220 and the first plate 230 by contacting the first roller 220.

Since the groove portion 235 and the elastic member 239 are formed to extend in the circumferential direction of the first plate 230, the first roller 220 and the elastic member 239 of the first plate 230 may continuously contact each other during rotation of the supporting plate 210.

A pressing plate 280 that presses the second plate 250 toward the supporting plate 210 may be arranged in front of the second plate 250. Although FIG. 7 shows that the elastic member 239 and first roller 220 are separated from each other, when the second plate 250 is pressed toward the supporting plate 210 by the pressing plate 280, the first roller 220 and the first plate 230 are pressed and the elastic member 239 is compressed, and thus the elastic member 239 and the first plate 230 may contact the first roller 220.

The first roller 220 and the elastic member 239 may be formed of materials having different friction coefficients. For example, the first roller 220 may be formed of a metal or a hard synthetic resin, whereas the elastic member 239 may be formed of a hard or soft synthetic resin or an elastic rubber.

When the first roller 220 contacts the elastic member 239 and the first plate 230, friction between the first roller 220 and the elastic member 239 and friction between the first roller 220 and the first plate 230 may be different from each other. The elastic member 239 maintains high friction during transmission of driving power for efficient power transmission, whereas the first plate 230 prevents the elastic member 239 from being excessively deformed and supports the elastic member 239.

In the power transmitting mechanism assembly as described above, slip that may occur between the first roller 220 and the first plate 230 during rotation of the first roller 220 may be minimized, and formation of dust and wear-off due to the dust may also be reduced. As a result, power transmitting efficiency may be improved.

Although the elastic member 239 is arranged on the first plate 230 in the embodiment shown in FIG. 7, the invention is not limited thereto. For example, a groove may be formed in the second plate 250, and an elastic member may be disposed on the groove of the second plate 250 and extend along the circumferential direction of the second plate 250.

Figure 8:
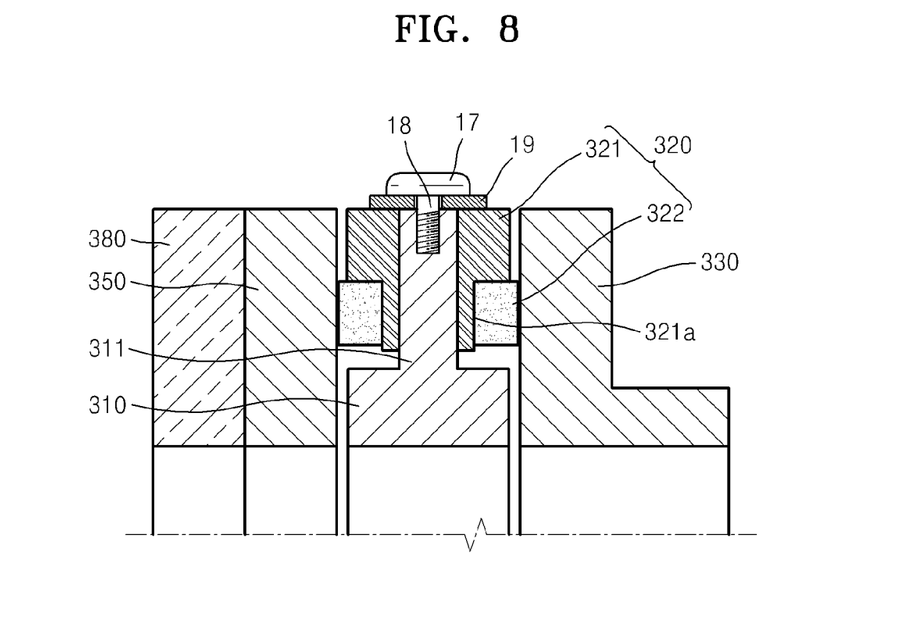
FIG. 8 is a lateral sectional view showing a part of components of a power transmitting mechanism assembly, according to another embodiment of the invention.

FIG. 8 is a lateral sectional view showing a part of components of a power transmitting mechanism assembly, according to another embodiment of the invention.

The power transmitting mechanism assembly according to the embodiment shown in FIG. 8 includes a supporting plate 310, rollers 320 rotatably attached to a supporting shaft 311 of the supporting plate 310, a first plate 330 that contacts a first end of the rollers 320 and may rotate with respect to the supporting plate 310, a power generating unit (not shown) that generates power for rotating the first plate 330 when a signal is applied, and a second plate 350 that is arranged to contact a second end of the rollers 320. The power generating unit (not shown) may have the same structure as shown in FIG. 1 and illustration thereof is omitted in FIG. 8.

The rollers 320 include an inner roller 322 and an outer roller 321 that are rotatably attached to the supporting shaft 311. The inner roller 322 and outer roller 321 are arranged in a direction in which a supporting shaft 311 extends. In the present embodiment, the outer roller 321 corresponds to a first roller, whereas the inner roller 322 corresponds to a friction changing unit.

The outer roller 321 includes a shaft unit 321a having a diameter smaller than the distance between the first plate 330 and the second plate 350, and the inner roller 322 may be rotatably attached to the shaft unit 321a of the outer roller 321. Therefore, when the outer roller 321 rotates with respect to the supporting shaft 311, the inner roller 322 rotates with respect to the outer roller 321, and thus the inner roller 322 may rotate with respect to the supporting shaft 311 independently from the outer roller 321.

The inner roller 322 and the outer roller 321 may be formed of materials having different friction coefficients. For example, the outer roller 321 may be formed of a metal or a hard synthetic resin, whereas the inner roller 322 may be formed of a soft synthetic resin or an elastic rubber.

When the rollers 320 are attached to the supporting shaft 311, the bolt 17 is attached to an end of the supporting shaft 311 via the guide bush 19. Due to the bolt 17 and the guide bush 19, the rollers 320 may rotate without being detached from the supporting shaft 311.

A pressing plate 380 that presses the second plate 350 toward the supporting plate 310 may be arranged in front of the second plate 350. Although FIG. 8 shows that the second plate 350 and the rollers 320 are separated from each other before contacting each other, when the second plate 350 is pressed toward the supporting plate 310 by the pressing plate 380, the inner roller 322 is compressed, and thus the first plate 330 and the rollers 320 may contact the second plate 350.

When the rollers 320 contact the first plate 330 and the second plate 350, friction between the inner roller 322 and the first plate 330 and the second plate 350 and friction between the outer roller 321 and the first plate 330 and the second plate 350 may be different from each other.

The inner roller 322 maintains high friction during transmission of driving power for efficient power transmission, whereas the outer roller 321 prevents the inner roller 322 from being excessively deformed and supports the inner roller 322.

In the power transmitting mechanism assembly as described above, slip that may occur between the rollers 320 and the first plate 330 and the second plate 350 during rotation of the rollers 320 may be minimized, and formation of dust and wear-off due to the dust may also be reduced. As a result, power transmitting efficiency may be improved.

Figure 9:
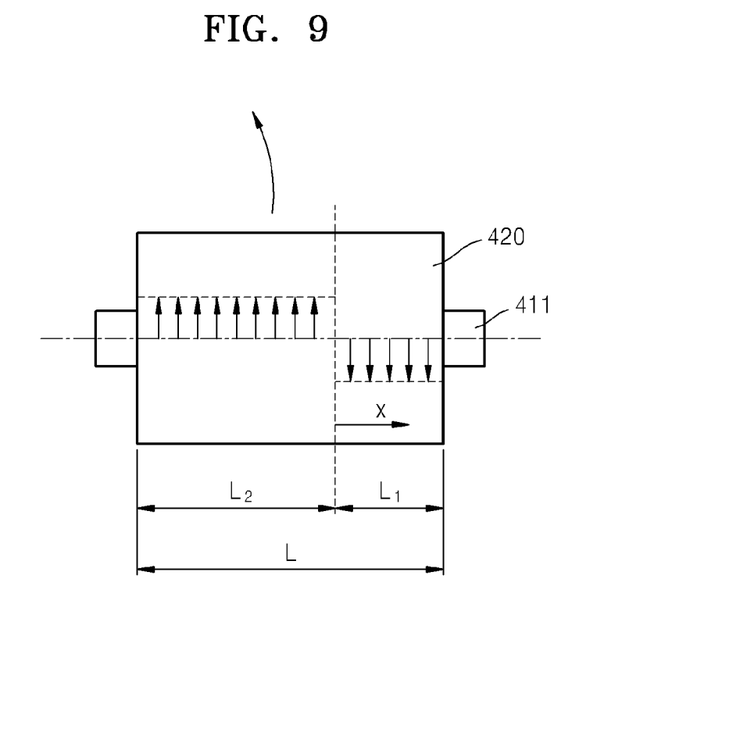
FIG. 9 is a diagram showing force applied to rollers according to a comparative embodiment manufactured for comparing power transmitting efficiency of a power transmitting mechanism assembly employing the rollers according to the comparative embodiment to power transmitting efficiency of the power transmitting mechanism assembly according to the embodiment shown in FIG. 8.

FIG. 9 is a diagram showing force applied to rollers according to a comparative embodiment that are manufactured for comparing power transmitting efficiency of a power transmitting mechanism assembly employing the rollers according to the comparative embodiment to power transmitting efficiency of the power transmitting mechanism assembly according to the embodiment shown in FIG. 8.

FIG. 9 shows an example in which rollers 420 that may rotate with respect to a supporting shaft 411 are formed of a single material. The overall length of the rollers 420 in a direction in which the supporting shaft 411 extends will be referred to as L. Portions of the rollers 420 corresponding to the right portion length L1 from a broken line are portions in which power is transmitted through normal friction contact, whereas portions of the rollers 420 corresponding to the left portion length L2 from the broken line are portions in which slip occurs on a friction surface.

Anti-rotation torque applied to the rollers 420 may be indicated as $\mu * P * (L_1^2 + L_2^2)/2$. Here, P indicates pressure maintained between the rollers 420 and a component contacting the rollers 420, whereas μ indicates a friction coefficient. If slip occurs at the center of the rollers 420, $L_1=L_2=L/2$. If the friction coefficient μ is 0.4, vertical force is 2 kgf, and three rollers 420 are arranged, anti-rotation torque applied to two opposite surfaces of the rollers 420 is about 80 gf*cm.

In the comparative embodiment shown in FIG. 9, due to centripetal force applied by rotation of a supporting plate (not shown), friction change occurs due to differences between rolling resistances in a direction in which the supporting shaft 411 extends (the direction indicated by an arrow X), that is, in a radial direction on contacting surfaces of the rollers 420.

Figure 10:
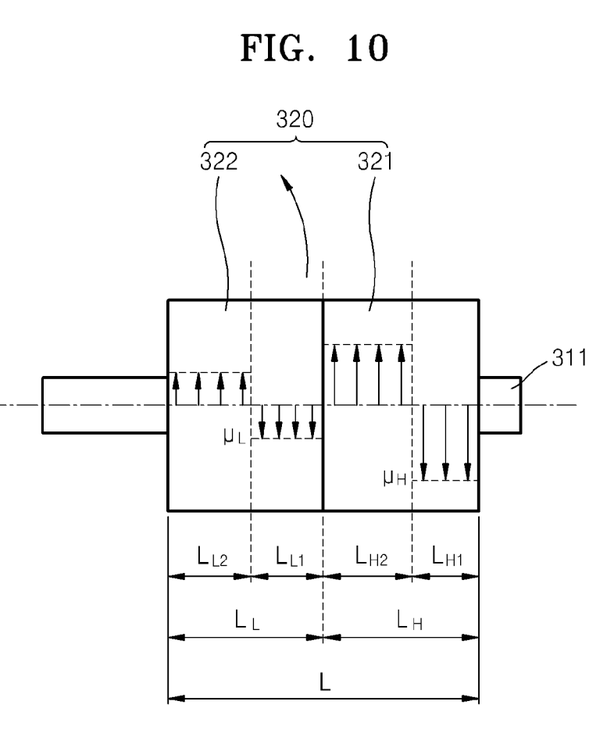
FIG. 10 is a diagram showing force applied to rollers of the power transmitting mechanism assembly of FIG. 8.

FIG. 10 is a diagram showing force applied to rollers of the power transmitting mechanism assembly of FIG. 8.

The rollers 320 that are rotatably attached to the supporting shaft 311 include the outer roller 321 and the inner roller 322, and thus anti-rotation torque Tr applied to the rollers 320 may be indicated as an equation below.

$$Tr=(\mu_H/2*(L_{H1}^2+L_{H2}^2)+\mu_L/2*(L_{L1}^2+L_{L2}^2))*(N/L)$$

If $\mu_H=0.5$, $\mu_L=0.3$, $L_{H1}=L_{H2}=0.5$, $L_{L1}=L_{L2}=0.5$, N=2000 gf/3, and L=2 in the above equation, anti-rotation torque Tr applied to two opposite surfaces of each of the three rollers 320 is about 40 gf*cm.

The outer roller 321 is divided into a slipping region $L_{H1}$ and a friction transmitting region $L_{H2}$ around the broken line. The inner roller 322 is divided into a slipping region $L_{L1}$ and a friction transmitting region $L_{L2}$ around the broken line.

As described above, if the rollers 320 are formed of different materials, rotating speeds of the inner roller 322 and the outer roller 321 differ from each other, and thus rolling resistance may be reduced. Therefore, anti-rotation torque is reduced as compared to the case in which the rollers 420 formed of a single material are used, and thus power transmitting efficiency may be improved.

Figure 11:
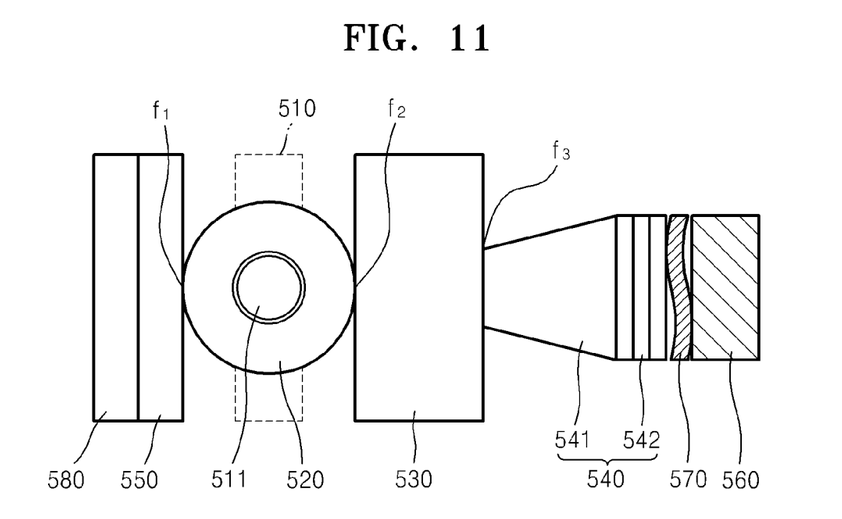
FIG. 11 is a schematic diagram showing relationships between components of the power transmitting mechanism assemblies of FIGS. 1 through 8.

FIG. 11 is a schematic diagram showing relationships between components of the power transmitting mechanism assemblies of FIGS. 1 through 8.

The power transmitting mechanism assembly according to the embodiment shown in FIG. 11 includes a supporting plate 510, rollers 520 rotatably attached to a supporting shaft 511 of the supporting plate 510, a first plate 530 that contacts a first end of the rollers 520 and may rotate with respect to the supporting plate 510, a power generating unit 540 that generates power for rotating the first plate 530 when a signal is applied, and a second plate 550 that is arranged to contact a second end of the rollers 520.

A pressing plate 580 that presses the second plate 550 toward the supporting plate 510 may be arranged in front of the second plate 550.

The power generating unit 540 includes an ultrasonic actuator 542 that vibrates when a signal is applied and a transmitting unit 541 that transmits vibration of the ultrasonic actuator 542 to the first plate 530.

Behind the ultrasonic actuator 542, a base 560 and a pressing member 570, which is interposed between the base 560 and the ultrasonic actuator 542 and applies elastic force to the ultrasonic actuator 542 and the base 560, are arranged. The base 560 is fixed with respect to other rotating components and supports the ultrasonic actuator 542.

The pressing member 570 interposed between the base 560 and the ultrasonic actuator 542 applies elastic force between the base 560 and the ultrasonic actuator 542. Due to the pressing member 570, a pressing force may be maintained among components from the ultrasonic actuator 542 to the second plate 550.

In FIG. 11, three contacting surfaces to which friction is applied are indicated as f1, f2, and f2. Contacting surfaces affected by pressing force of the pressing member 570 include the contacting surface f1 between the rollers 520 and the first plate 530, the contacting surface f2 between the rollers 520 and the second plate 550, and the contacting surface f3 between the transmitting unit 541 and the first plate 530.

Friction applied to each of the three contacting surfaces f1, f2, and f3 is determined based on vertical force that is vertically applied to a corresponding contacting surface and a friction coefficient, where the same vertical force is applied to the three contacting surfaces f1, f2, and f3 based on pressing force of the pressing member 570.

When the ultrasonic actuator 542 is driven while the rollers 520 are loaded, if pressing force of the pressing member 570 is inappropriate, slip occurs on the contacting surfaces f1 and f2 around the rollers 520 or the contacting surface f3 between the first plate 530 and the transmitting unit 541, and thus power loss occurs.

The greater the pressing force of the pressing member 570 is, the better for preventing slip. However, due to limits based on relationships against other components, it is necessary for the pressing member 570 to maintain the pressing force within an appropriate range.

Figure 12:
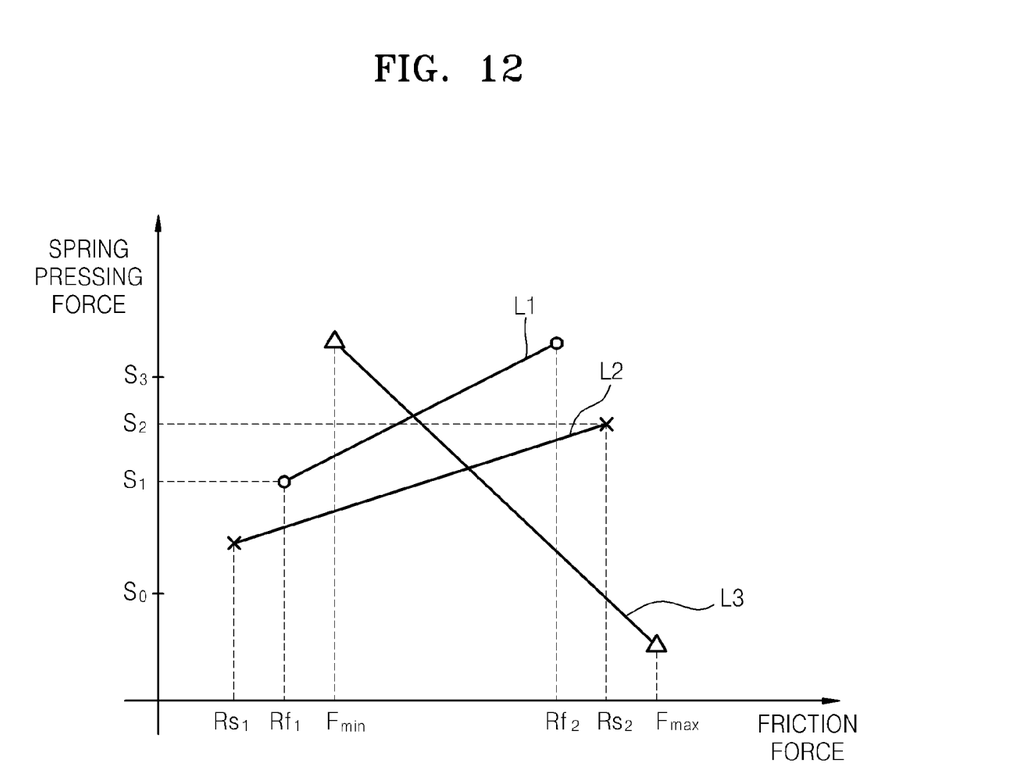
FIG. 12 is a graph showing mutual relationship between force and pressing force applied to the power transmitting mechanism assembly of FIG. 11.

FIG. 12 is a graph showing mutual relationships between force and pressing force applied to the power transmitting mechanism assembly of FIG. 11. The horizontal axis of the graph shown in FIG. 12 indicates friction force applied to each of the contacting surface f1, f2, and f3 shown in FIG. 11, whereas the vertical axis of the graph shown in FIG. 12 indicates pressing force applied by a spring used in the pressing member 570 of FIG. 11.

The pressing member 570 may adjust pressing force in a range from S0 to S3. The line L3 indicates magnitude of force due to vibration generated by the power generating unit 540. The greater the pressing force of the pressing member 570, the smaller the force of the power generating unit 540. On the contrary, the smaller the pressing force of the pressing member 570, the greater the force of the power generating unit 540.

The line L1 shows relative relationships between friction forces applied to the contacting surfaces f1 and f2 of the rollers 520 and pressing force of the pressing member 570. The greater the pressing force of the pressing member 570, the higher the friction forces applied onto the contacting surfaces f1 and f2 of the rollers 520. However, if the pressing force is smaller than S1, friction force becomes smaller than $R_{f1}$, and thus slip may occur. Furthermore, if the pressing force is too great, the rollers 520 may not rotate or a large amount of dust may be formed.

The line L2 shows relative relationships between friction force applied to the contacting surface f3 between the first plate 530 and the transmitting unit 541 and pressing force of the pressing member 570. The greater the pressing force of the pressing member 570, the higher the friction force applied onto the contacting surface f3. Although the minimum friction force for power transmission is $R_{S1}$, if the pressing force is greater than S2, friction force may become higher than $R_{S2}$, and thus noise and shock may occur. Furthermore, if the pressing force is too great, a large amount of dust may be formed on the contacting surface f3.

Therefore, for satisfying the three relationships L1, L2, and L3 shown in FIG. 12, it is necessary to adjust pressing force of the pressing member 570 within a range from S1 to S2, which is a range smaller than the overall permissible range of the pressing member 570 from S0 to S3. For improving efficiency of the power generating unit 540, it is necessary to design the power generating unit 540 to have a broader common range of permissible friction forces applied to the contacting surfaces f1, f2, and f3 that are affected by pressing force, so that limits of the power generating unit 540 due to permissible pressing force of the pressing member 570 may be reduced.

Range limit of pressing force of the pressing member 570 may be improved by improving mechanical properties of the contacting surfaces f1, f2, and f3 to which the pressing force is applied. For example, fiction characteristic of the contact surface f3 between the first plate 530 and the transmitting unit 541 may be adjusted by changing materials constituting the first plate 530 and the transmitting unit 541. However, such changes may affect durability, operability, and noise and vibration occurrences, and there is a limit of adjusting friction characteristic of the contact surface f3.

A method for overcoming limit of pressing force of the pressing member 570 by increasing friction coefficients of the contacting surfaces f1 and f2 of the rollers 520 may be considered. To increase friction coefficients of the contacting surfaces f1 and f2 of the rollers 520, the rollers 520 may be manufactured to have rough surfaces or a pattern may be embossed or engraved on surfaces of the rollers 520 for increased friction coefficient.

However, if surfaces of the rollers 520 are manufactured as stated above, the contacting surfaces f1 and f2 may wear off rapidly, and a large amount of dust is formed. Therefore, deterioration of precision due to dust may occur.

According to above embodiments of the invention, friction forces applied onto the contacting surfaces f1 and f2 of the rollers 520 may be increased while possibilities of dust formation and wear-off are kept low.

In the embodiments shown in FIGS. 1 through 6, friction is increased by employing a first roller and a second roller that are formed of materials having different friction coefficients. In the embodiment shown in FIG. 7, friction is increased by arranging an elastic member on a second plate that contacts rollers. In the embodiment shown in FIG. 8, friction change due to differences between rolling resistances in a radial direction on contacting surfaces between rollers by using centripetal force applied by rotation of a supporting plate.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as," "for example," etc.) provided herein, is intended merely to better illuminate the invention and does not pose a limitation on the scope of the invention unless otherwise claimed. Numerous modifications and adaptations will be readily apparent to those skilled in this art without departing from the spirit and scope of this disclosure.

What is claimed is:

1. A power transmitting mechanism assembly comprising:
   a supporting plate;
   a first roller rotatably attached to the supporting plate;
   a first plate contacting a first end of the first roller and arranged to rotate with respect to the supporting plate;
   a power generating unit that generates power for rotating the first plate when a signal is applied;
   a second plate arranged to contact a second end of the first roller; and
   a friction changing unit attached to at least one of the first roller, the first plate, or the second plate, and that changes friction of a portion of a contacting surface between the first roller and the first plate or friction of a portion of a contacting surface between the first roller and the second plate.

2. The power transmitting mechanism assembly of claim 1, wherein the first roller comprises a metal.

3. The power transmitting mechanism assembly of claim 2, wherein the friction changing unit is formed of a flexible material and is arranged to partially surround the outer surface of the first roller.

4. The power transmitting mechanism assembly of claim 3, wherein the friction changing unit is formed to have a ring-like shape and extends in the circumferential direction of the first roller.

5. The power transmitting mechanism assembly of claim 1, wherein the first plate comprises a groove portion formed on a surface contacting the first roller, and the friction changing unit is formed of an elastic material inserted in the groove portion.

6. The power transmitting mechanism assembly of claim 5, wherein the groove portion and the friction changing unit extend in the circumferential direction of the first plate.

7. The power transmitting mechanism assembly of claim 1, wherein the second plate comprises a groove portion formed on a surface contacting the first roller, and the friction changing unit is formed of an elastic material inserted in the groove portion.

8. The power transmitting mechanism assembly of claim 7, wherein the groove portion and the friction changing unit extend in the circumferential direction of the second plate.

9. The power transmitting mechanism assembly of claim 1, further comprising a second roller, which is formed of a first material having a friction coefficient different from that of a second material of the first roller, is apart from the first roller in the circumferential direction of the supporting plate, and is rotatably attached to the supporting plate.

10. The power transmitting mechanism assembly of claim 9, wherein the supporting plate is formed to have a circular ring-like shape, and the first roller and the second roller are symmetrically arranged around the center of the supporting plate.

11. The power transmitting mechanism assembly of claim 9, wherein the second roller is formed of a rubber or a synthetic resin.

12. The power transmitting mechanism assembly of claim 1, wherein the supporting plate comprises a supporting shaft that rotatably supports the first roller, and the friction changing unit is formed of a material having a friction coefficient different from that of a material constituting the first roller and is rotatably attached to the supporting shaft to rotate independently from the first roller.

13. The power transmitting mechanism assembly of claim 12, wherein the first roller comprises a shaft unit having a diameter smaller than a distance between the first plate and the second plate, and the friction changing unit is rotatably attached to the shaft unit.

14. The power transmitting mechanism assembly of claim 1, further comprising:
an ultrasonic actuator that vibrates when a signal is applied; and
a transmitting unit that transmits vibration of the ultrasonic actuator to the first plate.

15. The power transmitting mechanism assembly of claim 14, further comprising:
a base that supports the ultrasonic actuator; and
a pressing member arranged between the base and the ultrasonic actuator and applies an elastic force.

16. The power transmitting mechanism assembly of claim 1, wherein the second plate rotatably supports the supporting plate.

17. The power transmitting mechanism assembly of claim 1, wherein the second plate is arranged to be able to rotate with respect to the supporting plate.

* * * * *